US011153282B2

(12) United States Patent
Sardesai et al.

(10) Patent No.: US 11,153,282 B2
(45) Date of Patent: Oct. 19, 2021

(54) CONTROLLING ACCESS TO CONTENT IN A NETWORK

(71) Applicant: Verizon Patent and Licensing Inc., Arlington, VA (US)

(72) Inventors: Ashish Sardesai, Ashburn, VA (US); Dante J. Pacella, Charles Town, WV (US); Mani Tadayon, Leesburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 411 days.

(21) Appl. No.: 15/466,044

(22) Filed: Mar. 22, 2017

(65) Prior Publication Data

US 2018/0278424 A1    Sep. 27, 2018

(51) Int. Cl.
  *H04L 9/32*    (2006.01)
  *H04L 29/06*   (2006.01)
  *H04L 29/08*   (2006.01)
  *H04L 9/08*    (2006.01)

(52) U.S. Cl.
  CPC ........ *H04L 63/0428* (2013.01); *H04L 9/0894* (2013.01); *H04L 63/06* (2013.01); *H04L 63/102* (2013.01); *H04L 67/2842* (2013.01)

(58) Field of Classification Search
  CPC .... G06F 2212/402; G06F 21/60; G06F 21/31; G06F 21/62; G06F 21/6209; G06F 21/6227; G06F 2221/2111; G06F 2221/2107; H04L 29/06659; H04L 63/0428; H04L 9/0894; H04L 63/06; H04L 63/102; H04L 67/2842; H04L 63/0435; H04L 63/0442; H04L 63/045; H04W 12/06

USPC ........................................................ 713/168
See application file for complete search history.

(56) References Cited

U.S. PATENT DOCUMENTS

| | | | |
|---|---|---|---|
| 7,392,378 B1 * | 6/2008 | Elliott ................. | H04L 63/0428 380/277 |
| 9,178,694 B2 * | 11/2015 | Wolfe ....................... | H04L 9/00 |
| 9,906,510 B2 * | 2/2018 | Panchapakesan ....... | H04L 63/08 |

(Continued)

OTHER PUBLICATIONS

Misra et al, AccConF: An Access Control Framework for Leveraging In-Network Cached Data in the ICN-Enabled Wireless Edge, IEEE, Feb. 23, 2017, pp. 5-17.*

(Continued)

*Primary Examiner* — Luu T Pham
*Assistant Examiner* — Jenise E Jackson (57) ABSTRACT

A device can receive a first communication from a user device. The first communication can includes a request for content. The device can generate a record of content. The record of content includes a reference associated with the content and one or more encryption credentials associated with the content. The device can encrypt the record of content, to form an encrypted record of content, based on receiving the first communication. The device can provide the encrypted record of content to the user device based on receiving the first communication. The device can receive a second communication from the user device based on providing the encrypted record of content. The device can provide the content to the user device based on receiving the second communication.

20 Claims, 4 Drawing Sheets

(56) References Cited

U.S. PATENT DOCUMENTS

| | | | |
|---|---|---|---|
| 2002/0095568 A1* | 7/2002 | Norris | H04L 63/0869 713/151 |
| 2007/0101139 A1* | 5/2007 | Bayer | G06F 21/10 713/168 |
| 2008/0120657 A1* | 5/2008 | Dong | H04N 21/4367 725/82 |
| 2012/0042332 A1* | 2/2012 | Wajs | H04N 21/8456 725/31 |
| 2013/0003977 A1* | 1/2013 | Farrugia | G06F 21/10 380/279 |
| 2013/0080772 A1* | 3/2013 | McGowan | H04L 63/0428 713/165 |
| 2014/0019498 A1* | 1/2014 | Cidon | G06F 17/3007 707/827 |
| 2015/0287432 A1* | 10/2015 | Nakano | G06F 21/10 386/259 |
| 2015/0372817 A1* | 12/2015 | Jalili | G06F 21/6209 713/189 |
| 2016/0198202 A1* | 7/2016 | Van Brandenburg | H04N 21/26258 725/31 |
| 2016/0224799 A1* | 8/2016 | Uzun | G06F 21/6227 |
| 2016/0267023 A1* | 9/2016 | Perumpuli Arachchi | H04L 9/085 |
| 2017/0078723 A1* | 3/2017 | Rao | H04N 7/17318 |
| 2018/0139303 A1* | 5/2018 | Hudson | D01D 5/423 |
| 2018/0199086 A1* | 7/2018 | Rao | H04N 7/17318 |
| 2018/0255030 A1* | 9/2018 | Gupta | H04L 63/0428 |
| 2018/0276349 A1* | 9/2018 | Mine | H04L 9/08 |
| 2018/0278424 A1* | 9/2018 | Sardesai | H04L 9/3247 |
| 2019/0306133 A1* | 10/2019 | Allan | H04L 9/3213 |

OTHER PUBLICATIONS

Wood et al, Flexible End-to-End Content Security in CCN, IEEE, Jan. 13, 2014, pp. 858-865.*

* cited by examiner

CONTROLLING ACCESS TO CONTENT IN A NETWORK

BACKGROUND

Information-centric networking (ICN) can refer to a process of communicating an object (e.g., data, content, etc.) in a network (e.g., the Internet) based on a name of the object as opposed to an address of a network device associated with the object. For example, with ICN, a network device can provide an object to another network device in the network based on the name of the object instead of the address (e.g., an Internet Protocol (IP) address, etc.) associated with the other network device.

Ubiquitous caching can refer to a process of storing an object in cache memory of a plurality of devices in a network. For example, the object can be stored in a cache memory of every device that the object is received by and/or transmitted by in the network. The object can then be provided, based on a request from a user device, from the network device that stored the object and that is nearest to the user device, allowing the object to traverse as few network devices as possible.

In some implementations, a network that implements ICN can also implement ubiquitous caching.

DETAILED DESCRIPTION OF PREFERRED EMBODIMENTS

The following detailed description of example implementations refers to the accompanying drawings. The same reference numbers in different drawings can identify the same or similar elements.

Information Centric Networking (ICN) can allow a user device (e.g., a host, an end host, an endpoint, a device associated with a content subscriber, etc.) to request content from a network based on a name associated with the content. In some implementations, ICN can allow the user device to receive the content from any network device in the network that stored the content and can allow the user device to trust the authenticity of the content (e.g., that the content is the content that the user device requested, that a particular creator produced the content, etc.) regardless of the network device that provides the content to the user device. For example, the user device can trust the authenticity of the content based on a content signature associated with the content. In some implementations, ICN can allow communication, or allow communication to continue, after a failure of a network device in the network.

In some implementations, ICN can enable ubiquitous caching of the content throughout the network. Ubiquitous caching can allow the user device to provide a request for content and the user device can receive the content from the network device, nearest to the user device in the network, that stored the content (e.g., in a cache memory associated with that network device). In some implementations, ubiquitous caching can allow for a reduced time delay associated with providing content based on a request for the content from a user device.

However, ubiquitous caching can provide challenges associated with controlling access to content. For example, ubiquitous caching can allow the content to be available throughout the network so that a user device can provide a request for the content based on the name of the content and the user device can receive the content, based on the request, from the network device that is closest to the user device and that has the content stored in cache memory. In such a case, the user device can receive the content without permission from a content owner (e.g., an owner of rights associated with the content, an author of the content, a holder of a copyright associated with the content, etc.) and/or another party (e.g., a party that provides the content, etc.) associated with the content.

Furthermore, ubiquitous caching can prevent the content owner or the other party from determining an identity of a user associated with the user device and/or the user device that provides the request for the content and receives the content. Ubiquitous caching can also prevent the content owner or the other party from tracking information associated with the content, the user that receives the content, and/or the user device that receives the content.

Implementations described herein include a content management device that can generate a record of content (e.g., a schedule of content, a list of content, a manifest file associated with content, etc.) that includes a reference associated with content and one or more encryption credentials associated with the content. In some implementations, the content management device can encrypt the record of content based on a first communication (e.g., a first request for content) from a user device. In some implementations, the first request can include user identification information associated with the user device and/or a user of the user device. In some implementations, the content management device can determine an identity of the user and/or the user device and can authenticate and/or authorize the user and/or the user device to receive the content based on the user identification information.

In some implementations, the content management device can provide the encrypted record of content to the user device based on the first communication. In some implementations, the content management device can receive a second communication (e.g., a second request for content) from the user device based on providing the encrypted record of content. The content management device can provide the content to the user device based on receiving the second communication from the user device. In some implementations, the content management device can provide the content as encrypted content.

In this way, the content management device can prevent an unauthorized party from accessing the content. In addition, the content management device can determine an identity of a user associated with a user device and/or the user device that provides a request for content and can authenticate and/or authorize the user and/or the user device to receive the content. Furthermore, the content management device can track information associated with the content (e.g., type of content, length of content, frequency of requests for the content, etc.), the user that receives the content (e.g., user preferences, a user's demographic, etc.), and/or the user device that receives the content (e.g., a number of requests for the content, type and/or subject matter of content for which requests are most often provided, format of content that is acceptable, etc.).

Figure 1:
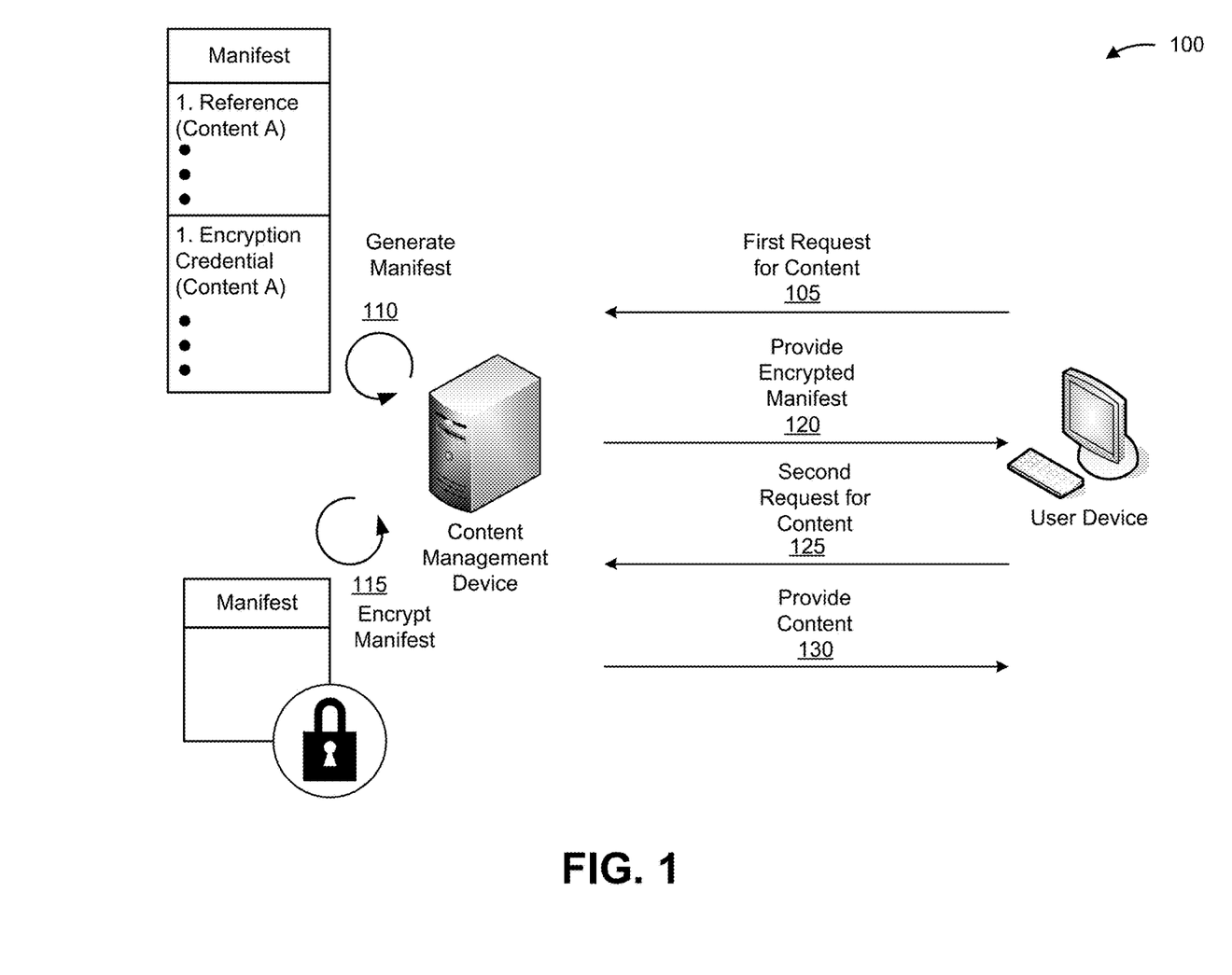
FIG. 1 is a diagram of an overview of an example implementation described herein.

FIG. 1 is a diagram of an overview of an example implementation 100 described herein. As shown in FIG. 1, assume that the content management device can store content locally (e.g., in main memory, in cache memory, in secondary memory, etc.) on the content management device and/or on a storage component (e.g., tertiary storage, a hard disk drive (HDD), etc.) associated with the content management device. As shown by reference number 105, the content management device can receive a first request for content from the user device. In some implementations, the first request can include a public key of a public/private key and/or user identification information (e.g., user profile information, a user identifier, a device identifier, etc.) associated with a user of the user device and/or the user device.

As shown by reference number 110, the content management device can generate a record of content (e.g., a manifest file) regarding content associated with (e.g., stored by) the content management device based on receiving the first request for content. For example, the manifest file can include a reference associated with the content and one or more encryption credentials associated with the content based on receiving the first request. In some implementations, the content management device can generate the reference associated with the content, where the reference can be an encoded name of the content to disguise the name of the content from unauthorized parties.

By generating the reference associated with the content, the content management device can prevent an unauthorized party from determining a name of content associated with the content management device. In this way, the content management device can prevent an unauthorized party from accessing the content.

In some implementations, the one or more encryption credentials can be used to encrypt the content. For example, the one or more encryption credentials can include a private key of a public/private key pair that the content management device can use to encrypt the content.

As shown by reference number 115, the content management device can encrypt the manifest file based on the first request. For example, the content management device can encrypt the manifest file using the public key included in the first request. As shown by reference number 120, the content management device can provide the encrypted manifest file to the user device based on the first request.

By encrypting the manifest file and providing the encrypted manifest file, the content management device can prevent an unauthorized party other than the user of the user device from accessing the manifest file. In this way, the content management device can also prevent the unauthorized party from accessing the content.

As shown by reference number 125, the content management device can receive a second request for content from the user device based on providing the encrypted manifest file. In some implementations, the second request can include the reference associated with the content that was included in the manifest file. In some implementations, the content management device can determine the content to be provided based on the reference associated with the content received with the second request.

As shown by reference number 130, the content management device can provide the content to the user device based on the second request from the user device. In some implementations, the content management device can provide the content based on the reference associated with the content received with the second request for content from the user device.

In some implementations, the content management device can provide the content as encrypted content. For example, the content management device can encrypt the content based on the one or more credentials included in the manifest file and the content management device can provide encrypted content to the user device.

In some implementations, the content management device can provide the encrypted content to the user device via one or more network devices (e.g., one or more servers, one or more forwarding devices, one or more edge devices, etc.) in a network associated with the content management device. For example, the content management device can provide the encrypted content to the one or more network devices and the one or more network devices can provide the encrypted content to the user device. In some implementations, the one or more network devices can store the encrypted content. In some implementations, the one or more network devices can provide the encrypted content to the user device with less time delay than the content management device can provide the encrypted content to the user device based on a subsequent request for the content because the one or more network devices might be geographically closer to the user device than the content management device.

By providing encrypted content to the user device, the content management device can prevent an unauthorized party from accessing the content. In this way, the content management device can prevent the unauthorized party from accessing the encrypted content from the content management device and/or from one or more network devices that receive and store the encrypted content.

By providing encrypted content to the user device via one or more network devices that store the encrypted content, the content management device can allow the one or more network devices to provide the encrypted content to the user device with less time delay than the content management device can provide the encrypted content to the user device based on a subsequent request for content. In this way, the content management device can reduce network traffic and utilization of computing resources associated with a request for content, as the request for content might not need to be transmitted from the user device to the content management device but instead from the user device to the one or more network devices.

In this way, the content management device can prevent an unauthorized party from accessing content associated with the content management device. In addition, the content management device can prevent an unauthorized party from accessing a manifest file regarding the content associated with the content management device. The content management device can also prevent an unauthorized party from determining a name of content associated with the content management device. In addition, the content management device can reduce network traffic and utilization of computing resources associated with a request for content, as the request for content might not need to be transmitted from the user device to the content management device.

As indicated above, FIG. 1 is provided merely as an example. Other examples are possible and can differ from what was described with regard to FIG. 1.

Figure 2:
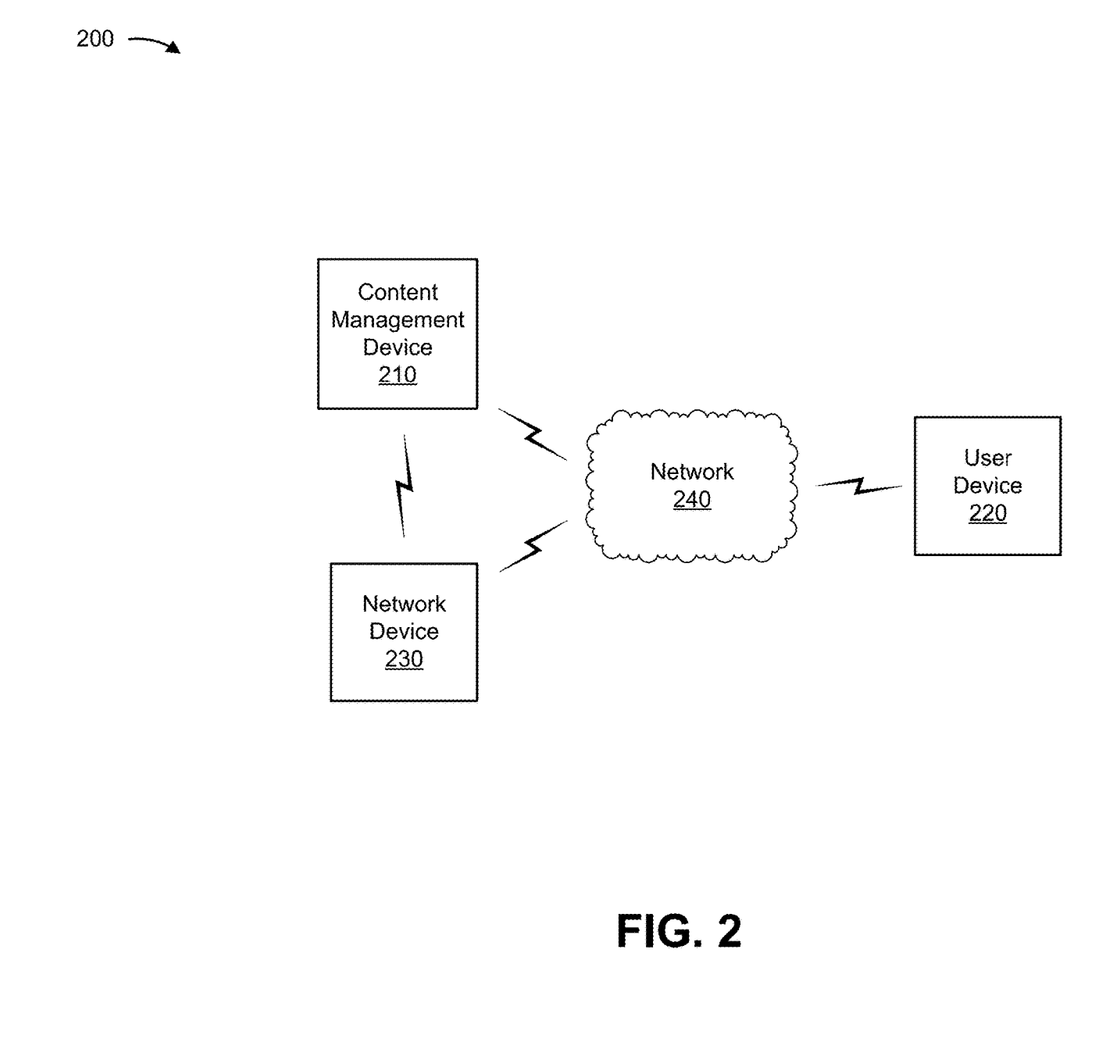
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include content management device 210, user device 220, network device 230, and network 240. Devices of environment 200 can interconnect via wired connections, wireless connections, or a combination of wired and wireless connections.

Content management device 210 includes a device capable of originating content, generating content and/or a record of content, encrypting the record of content, encrypting the content, receiving a communication associated with the content (e.g., a request for the content), providing the record of content (e.g., unencrypted, encrypted, etc.), and/or providing the content (e.g., unencrypted, encrypted, etc.) to user device 220 and/or network device 230. For example, content management device 210 can include a server device, a centralized server, a media server, a streaming device, a group of server devices, one or more devices provided in a cloud environment, and/or a similar type of device.

User device 220 includes one or more devices capable of receiving, storing, processing, and/or providing content received from content management device 210 and/or network device 230. For example, user device 220 can include a display device, a video wall, a television, a computer monitor, a smart phone, a tablet computer, a laptop computer, a desktop computer, a set top box, a smart television, a projector, and/or the like. In some implementations, user device 220 can include network device 230. In some implementations, user device 220 can be a component of a display device.

Network device 230 includes one or more devices capable of receiving content from content management device 210 and/or another network device 230, storing the content locally (e.g., in main memory, in cache memory, in secondary memory, etc.) on network device 230 and/or on a storage component (e.g., tertiary storage, a hard disk drive (HDD), etc.) associated with network device 230, and/or providing the content to user device 220. For example, network device 230 can include a gateway, an edge server, a server device, a group of server devices, a data center (e.g., a multi-server micro data center), a workstation computer, one or more devices provided in a cloud environment, a router, a switch, a hub, and/or a similar type of device. In some implementations, network device 230 can be geographically closer to user device 220 than content management device 210. In other words, network device 230 can be located at an edge position of a network (e.g., network 240) associated with content management device 210. In some implementations, at least one other device (e.g., a server device) can be located between network device 230 and user device 220. In other words, network device 230 can be in an intermediate position in a network associated with content management device 210.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network (NGN), etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In some implementations, network 240 can implement one or more aspects associated with Information Centric Networking (ICN) and/or ubiquitous caching.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
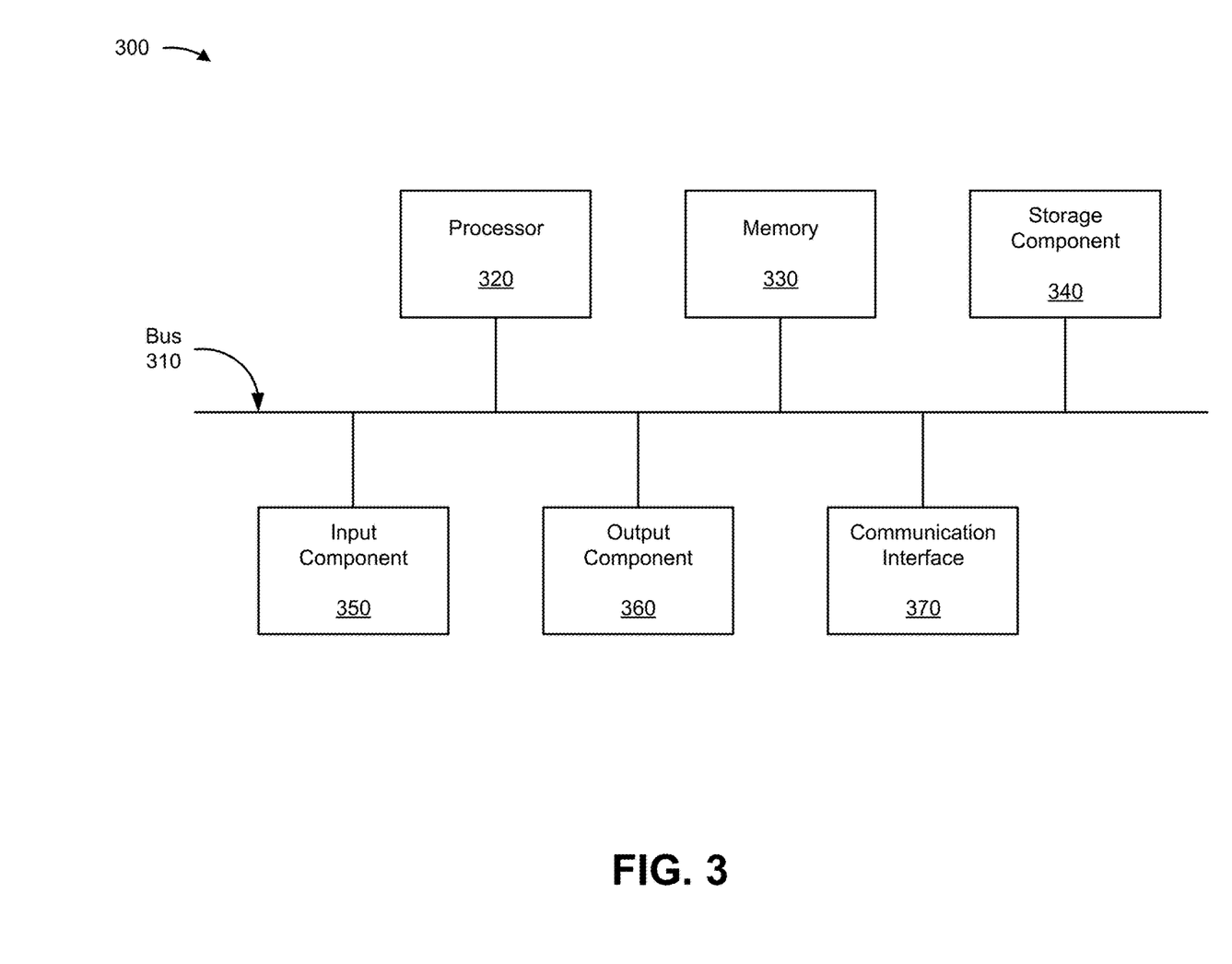
FIG. 3 is a diagram of example components of one or more devices of FIG. 2.

FIG. 3 is a diagram of example components of a device 300. Device 300 can correspond to content management device 210, user device 220, and/or network device 230. In some implementations, content management device 210, user device 220, and/or network device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
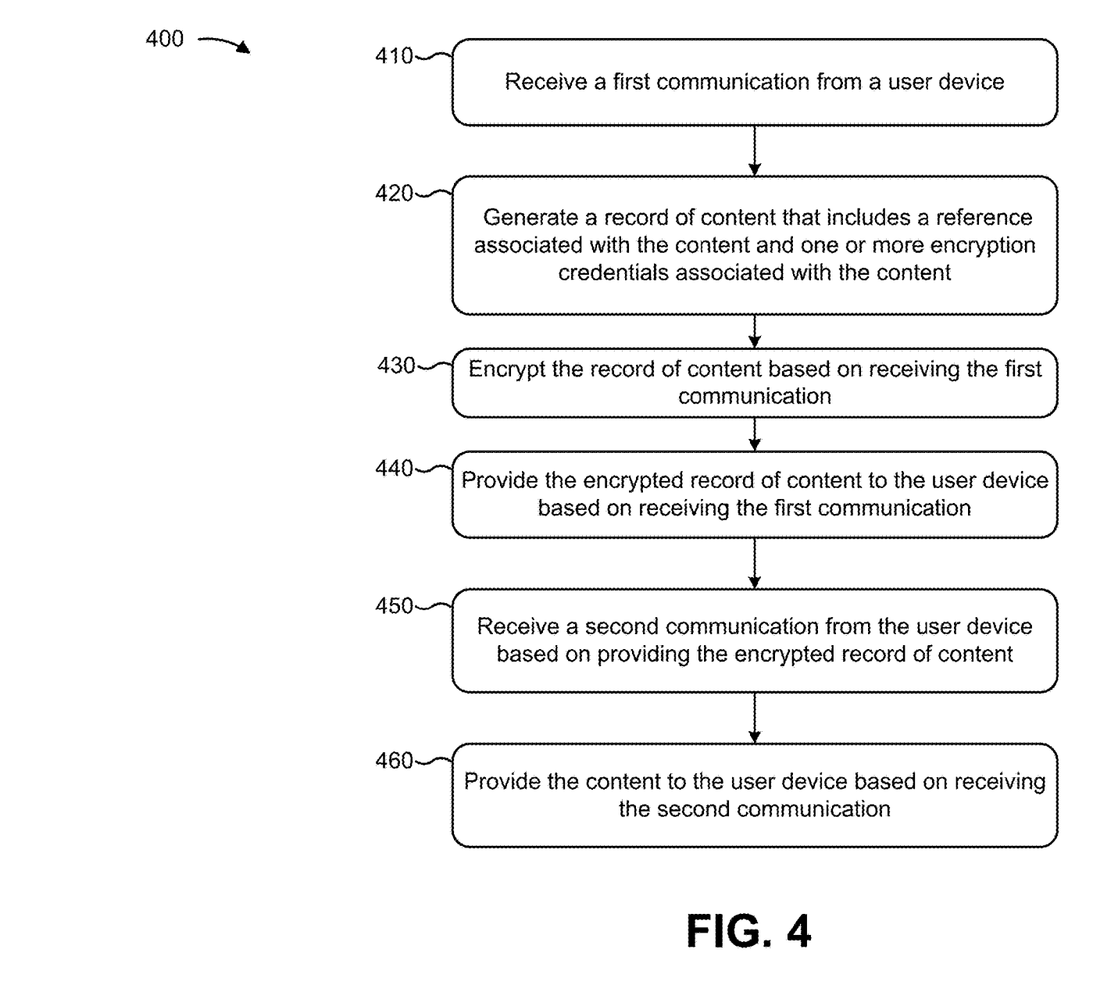
FIG. 4 is a flow chart of an example process for controlling access to content in a network via encryption.

FIG. 4 is a flow chart of an example process 400 for controlling access to content in a network via encryption. In some implementations, one or more process blocks of FIG. 4 can be performed by content management device 210. In some implementations, one or more process blocks of FIG. 4 can be performed by another device or a group of devices separate from or including content management device 210, such as user device 220 and/or network device 230.

As shown in FIG. 4, process 400 can include receiving a first communication from a user device (block 410). For example, content management device 210 can receive the first communication from user device 220.

In some implementations, the first communication can include a namespace. For example, content management device 210 can include the namespace associated with a user of user device 220 and/or user device 220. In some implementations, the namespace can include an identifier of content associated with content management device 210 and user identification information (e.g., user profile information, a user identifier, a device identifier, etc.) associated with the user and/or user device 220. In some implementations, the namespace can be based on a username (e.g., associated with the user and/or user device 220), a password (e.g., associated with the user and/or user device 220), a nonce word (e.g., associated with the user and/or user device 220), and/or the identifier of the content. In some implementations, content management device 210 can determine content associated with the user and/or user device 220 based on the namespace.

By receiving a namespace, content management device 210 can reduce a utilization of computing resources associated with determining the content that is authorized to be accessed by the user and/or user device 220.

In some implementations, the first communication can include an identifier (e.g., a name of the content, the reference associated with the content, a Universal Resource Locator (URL), a Uniform Resource Identifier (URI), a Logical Channel Identifier (LCI), a Logical Channel Number (LCN), etc.) of content associated with content management device 210. For example, the first communication can include a name of content that is stored by content management device 210.

In some implementations, the first communication can include a request from user device 220. For example, the first communication can include a request for content associated with content management device 210 from user device 220. In some implementations, content management device 210 can receive the first communication from user device 220 independent of a device address of content management device 210 and/or user device 220. For example, content management device 210 can receive the first communication based on a name associated with content management device 210 independent of an IP address of content management device 210.

In some implementations, the first communication can include one or more encryption credentials (e.g., one or more user encryption credentials) associated with a user of user device 220 and/or user device 220. For example, the first communication can include one or more encryption keys associated with the user and/or user device 220. In some implementations, the first communication can include a public key of a public/private key pair that is associated with the user and/or user device 220.

Additionally, or alternatively, the first communication can include user identification information (e.g., user profile information, a user identifier, a device identifier, etc.) associated with the user and/or user device 220. In some implementations, the user identifier can include a type-length-value (TLV) element based on the user and/or user device 220. In some implementations, the TLV element can be based on a username, a password, and/or a nonce word associated with the user and/or user device 220. In some implementations, content management device 210 can include a data structure (e.g., a database, etc.) that includes one or more TLV elements associated with content (e.g., content associated with content management device 210). For example, content management device 210 can include a database that includes a list of references associated with the content and/or names of the content associated with the one or more TLV elements. Each entry in the list of content can be associated with a TLV element of the one or more TLV elements. In some implementations, content management device 210 can determine content associated with the user and/or user device 220 based on the data structure that includes one or more TLV elements associated with the content.

By including a data structure (e.g., a database, etc.) that includes one or more TLV elements associated with content, content management device 210 can reduce a utilization of computing resources associated with determining the content that is authorized to be accessed by the user and/or user device 220.

In some implementations, the first communication can include a user identification reference to disguise the user identification information associated with the user and/or user device 220. For example, the user identification reference can include an encoded name, a nameless reference, a unique identifier associated with the user identification information, a reference generated via an encryption scheme, a reference generated via an encryption scheme based on an identifier (e.g., a name) associated with the user and/or user device 220, a reference generated via a hash function, and/or the like. The user identification reference may prevent an unauthorized party from determining the user identification information associated with the user and/or user device 220. In some implementations, content management device 210 can determine user identification information associated with the user and/or user device 220 based on the user identification reference.

In some implementations, the user identification information can include an indication (e.g., a flag) that the user identification information might not be stored by content management device 210. For example, the user identifier can include a do not cache flag. By providing an indication (e.g., a flag) that the user identification information might not be stored by content management device 210, content management device 210 can prevent an unauthorized party from obtaining the user identification information from content management device 210 and using the user identification information to request content from content management device 210. In this way, content management device 210 can prevent an unauthorized party from accessing the content based on a request for content that includes the user identification information.

In some implementations, content management device 210 can receive the first communication via network device 230. For example, network device 230 can receive the first communication from user device 220 and content management device 210 can receive the first communication from network device 230. In some implementations, content management device 210 can receive the first communication from network device 230 independent of a device address of content management device 210 and/or network device 230. For example, content management device 210 can receive the first communication from network device 230 based on a name associated with content management device 210 independent of an IP address of content management device 210. In some implementations, the first communication can include a device address of user device 220 and/or network device 230. For example, the first communication can include an Internet Protocol (IP) address of user device 220 and/or network device 230.

In some implementations, content management device 210 can validate that the content associated with the first communication can be provided. For example, content management device 210 can validate that the content associated with the first communication from user device 220 can be provided by content management device 210. In some implementations, content management device 210 can determine that content management device 210 has the content stored locally (e.g., in main memory, in cache memory, in secondary memory, etc.) on content management device 210 and/or on a storage component (e.g., tertiary storage, a hard disk drive (HDD), etc.) associated with content management device 210 based on a name of the content included in the first communication. For example, content management device 210 can compare the name of the content included in the first communication to the reference associated with the content to determine that the content is stored by content management device 210. In some implementations, content management device 210 can receive the first communication from network device 230 based on a device address of content management device 210 and/or network device 230.

In some implementations, content management device 210 can determine an identity of the user and/or user device 220 based on the user identification information. For example, content management device 210 can determine the identity of the user and/or user device 220 by comparing the user identification information included in the first communication to a list of user names associated with user identification information and determining a user name that corresponds to the user identification information included in the first communication.

In some implementations, content management device 210 can authenticate and/or authorize the user and/or user device 220 for access to the content. For example, content management device 210 can determine that the user and/or user device 220 is authenticated and/or authorized to access the content based on the user identification information included in the first communication and/or based on validating that the content can be provided. In some implementations, content management device 210 can determine that the user and/or user device 220 is authenticated for access to the content based on the user identification information and authentication information (e.g., a password, answer to a security question, etc.). In some implementations, the user identification information can include the authentication information.

In some implementations, content management device 210 can determine that the user and/or user device 220 is authorized to access the content by comparing the name of the content and the user identification information to a list of content associated with user identification information and determining that the name of the content is included in the list of content associated with the user identification information.

In some implementations, content management device 210 can obtain user identification information independent of the first communication. For example, content management device 210 can cause user device 220 to provide a prompt to the user to provide the user identification information to content management device 210 via user device 220.

By authenticating and/or authorizing a user and/or user device 220, content management device 210 can prevent an unauthenticated and/or an unauthorized user and/or user device 220 from accessing the content.

In some implementations, the first communication can include one or more communications (e.g., requests for content) from user device 220. For example, each of the one or more communications can correspond to each of one or more records of content. In some implementations, each of the one or more communications can correspond to each of one or more encrypted records of the content.

In this way, content management device 210 can receive a first communication from a user device.

As further shown in FIG. 4, process 400 can include generating a record of content that includes a reference associated with the content and one or more encryption credentials associated with the content (block 420). For example, content management device 210 can generate the record of content that includes the reference associated with the content and the one or more encryption credentials associated with the content.

In some implementations, the record of content can include a schedule of the content, a list of the content, a manifest file associated with the content, and/or the like. For example, the record of content can include a manifest file of content stored by content management device 210. In some implementations, content management device 210 can generate the record of content independent of receiving the first communication (e.g., before receiving the first communication, concurrently with receiving the first communication, or after receiving the first communication).

In some implementations, the reference associated with the content can include a reference to disguise the name of the content. For example, the reference associated with the content can include an encoded name, a nameless reference, a unique identifier associated with the content, a reference generated via an encryption scheme, a reference generated via an encryption scheme based on an identifier (e.g., a name) associated with the content, a reference generated via a hash function, and/or the like. The reference associated with the content may prevent an authorized party from determining the content, based on a name of the content, which is associated with content management device 210.

In some implementations, the reference associated with the content can include one or more additional records of content (e.g., one or more additional manifest files, etc.) associated with the content. For example, the reference associated with the content can include a first manifest file that includes a pointer to a second manifest file.

In some implementations, the one or more encryption credentials associated with the content can include an encryption credential that can be used to encrypt the content. For example, the one or more encryption credentials can include a symmetric key, an asymmetric key, a private key of a public/private key pair, and/or the like. By including the one or more encryption credentials associated with the content in the record of content, content management device 210 can permit the user and/or user device 220 to access the content and/or requesting the content.

In some implementations, the content can include any content that can be provided via user device 220 (e.g., video, audio, text, a video call, an audio call, linear video, live content, live streaming media, live video, live audio, live television, recorded content, gaming content, on-demand streaming media, interactive content, web objects, downloadable objects, applications, social media information, etc.). In some implementations, the content can be associated with content management device 210. For example, the content can include content that is generated by, stored on, received by, provided by, and/or to be provided by content management device 210. In some implementations, content management device 210 can receive the content from another content management device 210, a network device 230, and/or the like.

In some implementations, the content can include encrypted content. For example, the content can include encrypted content that was encrypted based on symmetric cryptography (e.g., shared secret encryption), asymmetric cryptography (e.g., public key encryption (PKE)), and/or the like. In some implementations, content management device 210 can encrypt the content. For example, content management device 210 can encrypt the content based on symmetric cryptography, asymmetric cryptography, and/or the like. In some implementations, content management device 210 can encrypt the content using the one or more encryption credentials included with the record of content.

In some implementations, content management device 210 can generate the record of content based on the first communication (e.g., a request for content) from user device 220. For example, the record of content can be generated based on identification information (e.g., a name of a user associated with user device 220, user identification information associated with the user and/or user device 220, a device identifier associated with user device 220, a user identifier associated with the user, an IP address of user device 220, etc.) included with the first communication.

By generating the record of content based on the first communication, content management device 210 may provide a record of content that is associated with the user and/or user device 220. In this way, content management device 210 can reduce utilization of computing resources associated with generating a record of content that is associated with more content than the content associated with the user and/or user device 220 (e.g., all content associated with content management device 210).

In some implementations, content management device 210 can generate the reference associated with the content. For example, content management device 210 can generate the reference associated with the content based on an encoding scheme, an encryption scheme, a hash function, and/or the like.

In some implementations, content management device 210 can divide (e.g., disassemble, chunk, etc.) the content into one or more pieces (e.g., chunks, etc.). For example, content management device 210 can divide the content into the one or more pieces suitable for providing the content to network device 230 and/or user device 220. In some implementations, content management device 210 can divide the content into the one or more pieces that have a size suitable for user device 220 to combine the one or more pieces so that user device 220 can provide the content to a user.

In some implementations, content management device 210 can encrypt the one or more pieces of the content. For example, content management device 210 can encrypt the one or more pieces of the content based on symmetric cryptography, asymmetric cryptography, and/or the like to provide one or more pieces of encrypted content. In some implementations, content management device 210 can encrypt the one or more pieces of content based on the one or more encryption credentials included with the record of content. For example, content management device 210 can encrypt the one or more pieces of content using a predetermined cipher based on the one or more encryption credentials included with the record of content. In some implementations, content management device 210 can encrypt the one or more pieces of content based on one or more encryption keys (e.g., a symmetric key, an asymmetric key, a public key of a public/private key pair, etc.). In some implementations, the one or more encryption keys can be replaced and/or rotated (e.g., regularly, periodically, non-periodically, etc.).

In some implementations, content management device 210 can encrypt groups of the one or more pieces of content based on the one or more encryption keys. For example, content management device 210 can encrypt a first group using a first encryption key, a second group using a second encryption key, a third group using a third encryption key, and/or the like. In some implementations, the first encryption key can be different from the second encryption key and/or the third encryption key and the second encryption key can be different from the third encryption key.

In some implementations, content management device 210 can generate the one or more encryption credentials (e.g., one or more encryption keys, one or more symmetric keys, one or more asymmetric keys, etc.). For example, content management device 210 can generate a private key of a public/private key pair. In some implementations, content management device 210 can generate the private key of a public/private key pair based on user identification information included in the first communication received by content management device 210. For example, content management device 210 can generate the private key of a public/private key pair based on the user identification information that was included in the first communication received by content management device 210.

In some implementations, content management device 210 can generate one or more references associated with the content so that each of the one or more references is associated with each of the one or more pieces of the content. For example, content management device 210 can generate a first reference that includes a hash of bytes that make up one piece of the one or more pieces of the content, a second reference that includes a hash of bytes that make up another piece of the one or more pieces of the content, and so on. In some implementations, content management device 210 can generate the record of content that includes the one or more references associated with each of the one or more pieces of the content and one or more encryption credentials that are associated with one or more encrypted pieces of the content.

In this way, content management device 210 can generate a record of content that includes a reference associated with the content and one or more encryption credentials associated with the content.

As further shown in FIG. 4, process 400 can include encrypting the record of content based on receiving the first communication (block 430). For example, content management device 210 can encrypt the record of content based on receiving the first communication.

In some implementations, content management device 210 can encrypt the record of content using symmetric cryptography and/or asymmetric cryptography. For example, the content management device 210 can encrypt the record of content based on a public key of a public/private key pair associated with the user and/or user device 220. In some implementations, content management device 210 can encrypt the record of content based on one or more encryption credentials associated with the first communication. For example, the content management device 210 can encrypt the record of content based on the public key of the public/private key pair included in the first communication from user device 220.

By encrypting the record of content, content management device 210 can prevent an unauthorized party from accessing the record of content. In this way, content management device 210 can also prevent an authorized party from accessing the content.

In some implementations, content management device 210 can encrypt the record based on authenticating and/or authorizing the user and/or user device 220. For example, content management device 210 can encrypt the record based on the public key of the public/private key pair included in the first communication after authenticating and/or authorizing the user and/or user device 220.

In this way, content management device 210 can encrypt the record of content based on receiving the first communication.

As further shown in FIG. 4, process 400 can include providing the encrypted record of content to the user device based on receiving the first communication (block 440). For example, content management device 210 can provide the encrypted record of content to user device 220 based on receiving the first communication.

In some implementations, content management device 210 can provide the encrypted record based on the user identification information included with the first communication. For example, content management device 210 can provide the encrypted record to user device 220 based on a user identifier associated with the user and/or a device identifier associated with user device 220.

In some implementations, content management device 210 can provide the encrypted record of content to user device 220 via network device 230. For example, content management device 210 can provide the encrypted record of content to network device 230 and network device 230 can provide the encrypted record of content to user device 220.

In some implementations, content management device 210 can provide the encrypted record of content based on a device address of user device 220 and/or network device 230. For example, content management device 210 can provide the encrypted record of content to user device 220 based on the IP address of user device 220 included in the first communication.

In this way, content management device 210 can provide the encrypted record of content based on receiving the first communication.

As further shown in FIG. 4, process 400 can include receiving a second communication from the user device based on providing the encrypted record of content (block 450). For example, content management device 210 can receive a second communication from user device 220 based on providing the encrypted record of content.

In some implementations, the second communication can include a request based on the reference associated with the content that was included with the record of content (e.g., the encrypted record of content). For example, the second communication can include a request that includes the reference associated with the content. In some implementations, the request can include the nameless reference that was included in the record of content.

In some implementations, the second communication can include one or more communications (e.g., requests for content) from user device 220. For example, each of the one or more communications can correspond to each of the one or more pieces of the content. In some implementations, each of the one or more communications can correspond to each of the one or more encrypted pieces of the content.

In some implementations, user device 220 can provide the one or more communications after decrypting the encrypted record of content using a private key of a public/private key pair used to encrypt the record of content, where the private key can be associated with the user and/or user device 220.

In some implementations, content management device 210 can receive the second communication via network device 230. For example, network device 230 can receive the second communication from user device 220 and content management device 210 can receive the second communication from network device 230. In some implementations, content management device 210 can receive the second communication from network device 230 independent of a device address of content management device 210 and/or network device 230. For example, content management device 210 can receive the second communication from network device 230 based on a name associated with content management device 210 independent of an IP address of content management device 210. In some implementations, the second communication can include a device address of user device 220 and/or network device 230. For example, the first communication can include an Internet Protocol (IP) address of user device 220 and/or network device 230. In some implementations, content management device 210 can receive the second communication from network device 230 based on a device address of content management device 210 and/or network device 230.

In this way, content management device 210 can receive a second communication from the user device based on providing the encrypted record of content.

As further shown in FIG. 4, process 400 can include providing the content to the user device based on receiving the second communication (block 460). For example, content management device 210 can provide the content to user device 220 based on receiving the second communication.

In some implementations, content management device 210 can provide the content to user device 220 as the one or more pieces of content. For example, content management device 210 can provide each of the one or more pieces of content to user device 220. In some implementations, content management device 210 can provide a single piece of the one or more encrypted pieces of content based on a single request for content from user device 220.

By providing the content as one or more pieces of content, content management device 210 can reduce network traffic and utilization of computing resources associated with providing the content as a whole, as providing the content as the one or more pieces of content can allow the content to travel through a network (e.g., network 240) with less time delay.

In some implementations, content management device 210 can provide the content to user device 220 as a whole. For example, content management device 210 can provide all of the content in a single communication to user device 220.

In some implementations, content management device 210 can provide the content to user device 220 as encrypted content. For example, content management device 210 can provide each of the one or more encrypted pieces of content to user device 220. In some implementations, content management device 210 can provide a single encrypted piece of the one or more encrypted pieces of content based on a single request for content from user device 220.

By providing the content as encrypted content, content management device 210 can prevent an unauthorized party from accessing the content. In this way, content management device 210 can prevent an unauthorized party from accessing the content from a network device (e.g., network device 230, etc.) that receives and stores the content.

In some implementations, content management device 210 can provide the content (e.g., encrypted content) to user device 220 via network device 230. For example, content management device 210 can provide encrypted content to network device 230 and network device 230 can provide the encrypted content to user device 220. In some implementations, content management device 210 and/or network device 230 can store the content (e.g., encrypted content) locally (e.g., in main memory, in cache memory, in secondary memory, etc.) on content management device 210 and/or network device 230 and/or on a storage component (e.g., tertiary storage, a hard disk drive (HDD), etc.) associated with content management device 210 and/or network device 230. For example, content management device 210 and/or network device 230 can store the encrypted content in cache memory of content management device 210 and/or network device 230.

In some implementations, network device 230 can provide the content (e.g., encrypted) to user device 220 independent of storing the content. For example, network device 230 can receive encrypted content from content management device 210 and network device 230 can provide the encrypted content to user device 220 without storing the encrypted content on network device 230.

In some implementations, content management device 210 can provide all of the one or more pieces of the content to network device 230 based on a request for content, associated with a piece of the one or more pieces of the content, from user device 220. For example, content management device 210 can receive a first request for content from user device 220 and the first request for content can be associated with a first piece of the one or more pieces of the content. Content management device 210 can provide all of the one or more pieces of the content to network device 230, based on the first request for content, independent of a second request for content associated with a second piece of the one or more pieces.

In this way, content management device 210 can provide the one or more pieces of the content to network device 230 so that network device 230 can expediently provide the one or more pieces of the content to user device 220 based on user device 220 requesting the one or more pieces.

By providing content to user device 220 via network device 230 and network device 230 storing the content, content management device 210 can allow network device 230 to provide the content to user device 220 with less time delay than content management device 210 can provide the content to user device 220 based on a subsequent request for content (e.g., subsequent to the first communication and/or the second communication). In this way, content management device 210 can also reduce network traffic and utilization of computing resources associated with a subsequent request for content, as the subsequent request for content might not need to be transmitted from user device 220 to the content management device 210 but instead from user device 220 to network device 230 that is closer to user device 220 than content management device 210.

By storing content in cache memory, content management device 210 and/or network device 230 can provide the content with less time delay than if the content were stored in main memory of content management device 210 and/or network device 230.

In some implementations, content management device 210 can identify a plurality of network devices 230 (e.g., two network devices 230, three network devices 230, etc.) that are closest to user device 220. Content management device 210 can provide the content to each of the plurality of network devices 230 based on identifying the plurality of network devices 230.

By identifying a plurality network devices 230 that are closest to user device 220 and providing the content to the plurality of network devices 230, content management device 210 can enable one or more network devices 230 of the plurality of network devices 230 to provide the content to user device 220 in case of a failure of the network device 230 that is closest to user device 220. In this way, user device 220 can experience no change or little change in the way user device 220 receives the content as compared to the case where the network device 230 that is closest to user device 220 does not experience a failure.

In some implementations, content management device 210 can provide the content via network device 230. For example, network device 230 can receive the content from content management device 210 and network device 230 can provide the content to user device 220. In some implementations, content management device 210 can provide the content to network device 230 independent of a device address of content management device 210 and/or network device 230. For example, content management device 210 can provide the content to network device 230 based on a name associated with network device 230 independent of an IP address of network device 230. In some implementations, content management device 210 can provide the content based on a device address of user device 220 and/or network device 230.

In some implementations, network device 230 can provide the content based on a communication (e.g., a request for content, etc.) associated with the content. For example, network device 230 can provide the content to user device 220 based on a third communication that requests the content and that is subsequent to the first communication (e.g., a first request for content from user device 220) and the second communication (e.g., a second request for content from user device 220). In some implementations, network device 230 can provide the content based on a request from user device 220, another network device 230, another content management device 210, and/or the like.

In some implementations, content management device 210 can receive information associated with the content (e.g., type of content, length of content, frequency of requests for the content, etc.), the user that receives the content (e.g., user preferences, a user's demographic, etc.), and/or user device 220 that receives the content (e.g., a number of requests for the content, type and/or subject matter of content for which requests are most often provided, format of content that is acceptable, etc.). In some implementations, content management device 210 can track usage of the content based on the information associated with the content, the user that receives the content, and/or user device 220 that receives the content. For example, content management device 210 can track the content that requires a largest amount of bandwidth as the content is provided and/or received via network 240.

In some implementations, content management device 210 can generate one or more reports based on the information associated with the content, the user that receives the content, and/or user device 220 that receives the content. For example, content management device 210 can generate a report that includes a list of content that was requested most often by the user associated with user device 220. Content management device 210 can use the one or more reports to predict content that the user may request in the future. Content management device 210 might send the predicted content to one or more network devices 230 so that the one or more network devices 230 can expeditiously service a request for the predicted content from user device 220.

In this way, content management device 210 can provide the content to the user device based on receiving the second communication.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, content management device 210 can prevent an unauthorized party from accessing content associated with the content producer device. In addition, content management device 210 can prevent an unauthorized party from accessing a record of content regarding the content associated with content management device 210. Content management device 210 can also prevent an unauthorized party from determining a name of content associated with content management device 210. In addition, content management device 210 can reduce network traffic and utilization of computing resources associated with a request for content, as the request for content might not need to be transmitted from user device 220 to content management device 210. Content management device 210 and/or network device 230 can also provide the content with less time delay than if the content were stored in main memory of content management device 210 and/or network device 230.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors, at least partially implemented in hardware, to:
receive a first request for content from a user device,
where the first request for content includes a user encryption credential
that comprises a public key;
generate a record of content,
where the record of content includes a reference associated with each of one or more pieces of the content and one or more encryption credentials associated with one or more pieces of encrypted content,
  where the one or more encryption credentials are associated with encrypting the one or more pieces of the content, and
  where the reference comprises an encoded name of the content;
encrypt the record of content using the public key, to form an encrypted record of content, based on receiving the first request for content;
provide the encrypted record of content to the user device based on receiving the first request for content;
receive a second request for content from the user device based on providing the encrypted record of content;
provide the one or more pieces of encrypted content to a plurality of network devices; and
provide, via a subset of the plurality of network devices that are geographically closest to the user device, at least one of the one or more pieces of encrypted content to be provided to the user device, based on receiving the second request for content,
  where the at least one of the one or more pieces of encrypted content are provided to the user device by the subset of the plurality of network devices via information centric networking, and
  where the at least one of the one or more pieces of encrypted content provided to the user device are retrieved from cache memory.

2. The device of claim 1, where the one or more processors are further to:
generate the reference associated with each of the one or more pieces of the content; and
encrypt the one or more pieces of the content using the one or more encryption credentials.

3. The device of claim 1, where the first request for content includes user identification information, and where the one or more processors, when providing the encrypted record of content to the user device, are to:
provide the encrypted record of content to the user device based on the user identification information.

4. The device of claim 3, where the one or more processors are further to:
authorize a user associated with the user device to access the one or more pieces of the content based on the user identification information; and
where the one or more processors, when providing the encrypted record of content to the user device, are to:
provide the encrypted record of content to the user device based on authorizing the user associated with the user device to access the one or more pieces of the content.

5. The device of claim 1, where the one or more processors are further to:
generate the one or more encryption credentials; and
encrypt the one or more pieces of the content using the one or more encryption credentials.

6. The device of claim 1, where the one or more encryption credentials include a first encryption credential and a second encryption credential, and where the one or more processors are further to:
encrypt a first group of the one or more pieces of the content using the first encryption credential; and
encrypt a second group of the one or more pieces of the content using the second encryption credential,
  where the first encryption credential is different from the second encryption credential.

7. The device of claim 1, where the one or more processors are further to:
divide the content into two or more pieces of content; and
encrypt the two or more pieces of content to form two or more encrypted pieces of content.

8. The device of claim 1, where the first request for content includes a name associated with the content, and
where the one or more processors are further configured to:
validate that the content can be provided based on the name associated with the content.

9. The device of claim 1, where information centric networking comprises information centric networking with ubiquitous caching.

10. The device of claim 1, where the subset of the plurality of network devices that are geographically closest to the user device comprise one or more edge servers.

11. A non-transitory computer-readable medium storing instructions, the instructions comprising:
one or more instructions that, when executed by one or more processors, cause the one or more processors to:
receive a first request for content from a user device,
  where the first request for content includes a user encryption credential that comprises a public key;
generate a record of content,
  where the record of content includes a reference associated with content and one or more encryption credentials associated with encrypted content associated with the content;
encrypt the record of content based on receiving the first request for content and based on the public key;
provide the encrypted record of content to the user device based on receiving the first request for content;
receive a second request for content from the user device based on providing the encrypted record of content;
provide the encrypted content to a plurality of network devices; and
provide, via a subset of the plurality of network devices that are geographically closest to the user device, the encrypted content to be provided to the user device based on receiving the second request for content,
  where the encrypted content is provided to the user device by the subset of the plurality of network devices via information centric networking, and
  where the encrypted content provided to the user device is retrieved from cache memory.

12. The non-transitory computer-readable medium of claim 11, where the record of content is a first record of content, and where the reference associated with the content includes a second record of content.

13. The non-transitory computer-readable medium of claim 11, where the one or more instructions, that cause the one or more processors to provide the encrypted record of content, cause the one or more processors to:
authorize the user device to access the content based on the first request for content; and
provide the encrypted record of content to the user device based on authorizing the user device to access the content.

14. The non-transitory computer-readable medium of claim 11, where the first request for content includes a name associated with the content, where the one or more instructions, when executed by the one or more processors, further cause the one or more processors to:
  validate that the content can be provided based on the name associated with the content.

15. A method, comprising:
  receiving, by a device, a first communication from a user device,
    where the first communication includes a request for content and a user encryption credential;
  generating, by the device, a record of content,
    where the record of content includes a reference associated with the content and one or more encryption credentials associated with encrypted content, and
    where the reference comprises an encoded name of the content;
  encrypting, by the device, the record of content, to form an encrypted record of content, based on receiving the first communication and based on the user encryption credential;
  providing, by the device, the encrypted record of content to the user device based on receiving the first communication;
  receiving, by the device, a second communication from the user device based on providing the encrypted record of content;
  providing, by the device, the encrypted content to a plurality of network devices; and
  providing, by the device, via a subset of the plurality of network devices that are geographically closest to the user device, the encrypted content to be provided to the user device based on receiving the second communication,
    where the encrypted content is provided to the user device by the subset of the plurality of network devices via information centric networking, and
    where the encrypted content provided to the user device is retrieved from cache memory.

16. The method of claim 15, further comprising:
  generating the one or more encryption credentials; and
  encrypting the content, using the one or more encryption credentials, to form the encrypted content.

17. The method of claim 15, where providing the encrypted content to the plurality of network devices based on receiving the second communication comprises:
  providing the encrypted content to the plurality of network devices,
    where the encrypted content was encrypted using the one or more encryption credentials of the record of content.

18. The method of claim 15, where encrypting the record of content based on receiving the first communication comprises:
  encrypting the record of content based on a public key of a public/private key pair.

19. The method of claim 15, further comprising:
  dividing the content into one or more pieces of content; and
  encrypting the one or more pieces of content to form one or more encrypted pieces of content; and
  where providing the encrypted content to the plurality of network devices comprises:
    providing the one or more encrypted pieces of content to the plurality of network devices.

20. The method of claim 19, where the information centric networking comprises information centric networking with ubiquitous caching.

* * * * *